March 11, 1941.  E. R. KANHOFER  2,234,177
CONVERSION OF OLEFIN HYDROCARBONS
Filed Nov. 4, 1938
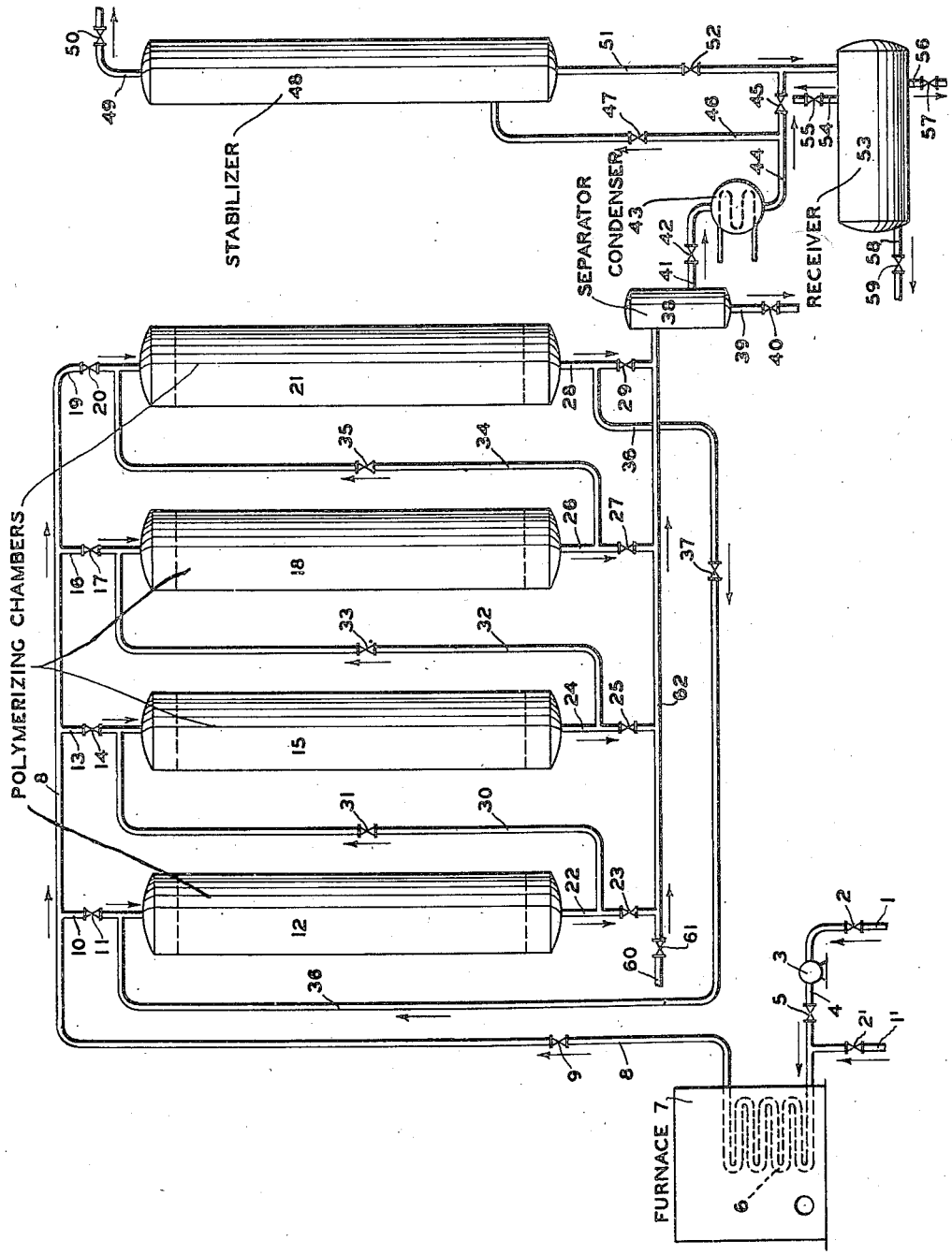
Inventor:
Elmer R. Kanhofer,
By: Lee J. Gary
Attorney.

Patented Mar. 11, 1941

2,234,177

UNITED STATES PATENT OFFICE 2,234,177

CONVERSION OF OLEFIN HYDROCARBONS

Elmer R. Kanhofer, Chicago, Ill., assignor to Universal Oil Products Company, Chicago, Ill., a corporation of Delaware Application November 4, 1938, Serial No. 238,823

5 Claims. (Cl. 196—10)

This invention relates particularly to processes for the conversion of normally gaseous olefinic hydrocarbons including ethene, propene, and the butenes, into liquids of light motor fuel boiling range while utilizing special catalysts and conditions of operation.

In a more specific sense the invention is concerned with an improved feature utilizable when causing the polymerization of normally gaseous olefins by contact with solid granular catalysts in that the life of the catalyst is extended considerably before reactivation is necessary, and its ultimate life is also prolonged.

The industry is familiar with numerous granular materials which have a polymerizing action upon hydrocarbons of varying degree of unsaturation. Some of these such as fullers earth and other clays of the bentonite type function principally by virtue of their high absorbent character while others have a more powerful action, granular materials supporting acids and various metal halides falling in the latter category. In all cases where olefin-containing vapors or gases are contacted with granular polymerizing catalysts there is a gradual deposition of heavy tarry substances due possibly to undesirable side reactions such as over-polymerization with the formation of high molecular weight polymers until the catalyst particles are coated to an extent rendering them practically inert. At this time reactivation is commonly practiced by first carefully burning off the carbonaceous deposits with air or other oxidizing gas mixtures and then subjecting the contact materials to any other treatment to restore the optimum composition of the active ingredient.

Granular materials which have been found to be especially efficient in converting normally gaseous olefins into mono-olefinic polymers of gasoline boiling range are catalysts including as their essential ingredient, acids of phosphorus and particularly acids approaching pyro-phosphoric acid, $H_2P_4O_7$ in composition. Such materials are commonly made by mixing a minor proportion of a relatively inert finely divided support such as kieselguhr with a major proportion of a phosphoric acid, calcining the initially formed pasty material at temperatures of the order of 400° C. until a solid cake is obtained, then grinding and sizing the cake to produce particles of practical size and finally subjecting the granules to steam contact at a definite temperature to produce an acid of phosphorus of the required hydration corresponding to the best catalytic action. Catalysts of this character are effective over relatively long periods of time for causing polymerization reactions between the normally gaseous olefins such as those contained in cracked gas mixtures and particularly in producing dimers and trimers of the propene and the butenes and also mixed polymerization products thereof. When spent after a period of service considerable care must be exercised in burning off carbonaceous deposits to prevent over-dehydration and loss of acidic material by volatilization so that as a rule oxidation is brought about with gas mixtures of relatively low oxygen content such as combustion gas mixtures followed finally by the use of air so that temperatures of 1000° F. are not exceeded at any point in the catalyst masses. After this burning step, the particles are steamed at temperatures of the order of 500° F. under atmospheric pressure to restore the active acid to its approximately original composition. This periodic reactivation is somewhat delicate and time-consuming so that any methods by which the reactivation periods could be spaced farther apart would be an improvement in the general operation. The present invention is concerned with such an improvement.

In one specific embodiment the present invention comprises periodically lowering the temperature sufficiently in reactors in which normally gaseous olefins are undergoing polymerization by contact with granular polymerizing catalysts to cause a partial condensation of hydrocarbon liquids on the catalyst granules and dissolve heavy hydrocarbon material therefrom and alternately raising the temperature again to a point corresponding to the most efficient conversion of the olefins in the gas mixtures being processed.

The present invention is broadly applicable to processes in which normally gaseous olefins such as those present in so-called stabilizer refluxes are contacted with solid granular catalysts. Since the improvement which constitutes the present invention is particularly adaptable to use in connection with processes employing the solid granular phosphoric acid-containing catalyst whose manufacture is briefly described above, the subsequent description of process operation will be made in connection with this type of catalyst although not with the intention of improperly circumscribing the scope of the invention.

For the sake of illustrating the type of process flow to which the present invention is adapted, the attached diagrammatic drawing is provided which indicates in general outline without regard to absolute or relative scales a simple arrangement of apparatus in which processes of the character under discussion and the improvement which constitutes the present invention may be practiced.

Referring to the drawing, charging stocks comprising olefin-containing gas mixtures may be admitted to the plant by way of line 1 containing valve 2 to a charging pump 3 which may be of a compressor type if the charge is gaseous and the ordinary reciprocal or rotary type if the charge is liquid as may be the case with butane-butene fractions under pressure. The charge to the plant is pumped into line 4 containing valve 5 through a heating element 6 disposed to receive heat from a furnace 7 after the addition of minimum but required amounts of steam by way of line 1₂ containing valve 2'. The admission of steam at this point is necessary to assist in counterbalancing the loss of water from the acid constituents of the catalyst granules during the polymerizing step.

The heated charge usually at some temperature within the approximate range of 350–500° F. and under some pressure within the range of 100–500 lbs. per square inch passes through line 8 containing valve 9 and may enter any one of a series of interconnected catalyst chambers which are arranged so that they may be operated in series according to the potency of the catalytic material in each tower. Thus branch line 10 containing valve 11 leads to a chamber 12, branch line 13 containing valve 14 to a chamber 15, branch line 16 containing valve 17 to a chamber 18, and branch line 19 containing valve 20 to a chamber 21. Four chambers have been shown because this is a common number in many commercial plants and not because such processes require exactly four chambers. Two or more may be used in any instance as long as one can be in service while the other is being reactivated. Chamber 12 has an outlet line 22 containing valve 23; chamber 15 has an outlet line 24 containing valve 25; chamber 18 has an outlet line 26 containing valve 27; and chamber 21 has an outlet line 28 containing valve 29; all leading to a common header 62 so that the products from whichever chamber is the last of a series can be discharged into this header and thence to a separator 38 the function of which will be presently described. To permit series flow from left to right as shown in the drawing which is the primary arrangement with fresh catalyst in each tower, line 30 containing valve 31 connects line 22 and line 13, line 32 containing valve 33 connects line 24 and line 16, and line 34 containing valve 35 connects line 26 and line 19. A line 36 containing valve 37 leads back from line 28 to line 10 which makes possible the further passage of insufficiently treated material from the chamber 21 as the first or intermediate tower of a series back to tower 12 which may then be the last of the series in operation. It will be obvious to those skilled in manipulations of this character that any one tower of the series shown may be the first, intermediate or last in the series using the connections shown.

In order to avoid corrosion of line 62 due to traces of phosphoric acids which may be washed downwardly from the catalyst beds in the treating chambers, line 60 containing valve 61 is provided for the admission of alkaline solutions. Header 62 leads into a hot separator 38 in which anti-corrison wash liquids and condensed water and other aqueous condensates are admitted, the aqueous layer being withdrawn through line 39 containing valve 40 and thus disposed of. Line 41 containing valve 42 leads to a final condenser 43 which is operated at a proper temperature to permit the succeeding stabilization of the polymer products to remove undesirably large amounts of high vapor pressure dissolved constituents such as unconverted butanes and light products of polymerization. In case the raw product is to be treated in any way before stabilization, it may be passed directly through line 44 containing valve 45 to line 51 and thence to receiver 53. As a rule the unstabilized material is passed through line 46 containing valve 47 to a stabilizer 48 in which conditions are maintained for the removal of the light hydrocarbons mentioned which are released through line 49 containing valve 50. The stabilized product follows line 51 containing valve 52 to the final receiver 53 which has a gas vent line 54 containing a valve 55, a water draw line 56 containing valve 57 and a polymer draw line 58 containing valve 59. The material in receiver 53 in the plant shown in the drawing will contain undesirably heavy materials due to the washing effect of the polymers and will usually need subsequent redistillation to fractionate off the desired gasoline materials or other fraction as an overhead.

In accordance with the present invention the temperature of each catalyst chamber is periodically lowered during service to permit a certain amount of condensation of hydrocarbon materials which consist probably of primarily formed polymers which act to dissolve heavy hydrocarbon compounds from the catalyst particles and thus clean them off to continually present new catalytic surfaces. While the temperature may be periodically dropped to different degrees depending upon the extent of washing necessary for best results, the temperature most commonly used is 225° F. which may be obtained in practice by jacketing the chambers and passing air or other cool fluids through the jackets. Other devices may be used consisting of interior coils in the catalyst bed to effect a more uniform distribution of temperature although no particular harm is done if the temperature is somewhat uneven at least for a primary period corresponding to the initial temperature drop since all parts of the catalyst bed will be effectively washed after the temperature reaches some desired low figure. In continuous operation the temperature is dropped for a period of 5 or 6 hours about once a week and it has been found that whereas solid phosphoric acid catalyst beds ordinarily need reactivation by oxidation and steaming about every 50 days this period of active service may be extended to over 70 days by the use of the present feature of operation. The process further extends the ultimate life of the catalyst since there is a more or less extensive permanent impairment of the catalyst polymerizing properties after each reactivation due to actual loss of acid material by volatilization. It is noted that after a period of low temperature operation with accompanying washing effects that the pressure drop through the catalyst bed is substantially reduced indicating a definite restoration of the original porosity of the bed and the removal of contaminating substances.

I claim as my invention:

1. In the polymerization of normally gaseous olefins in the presence of solid polymerizing catalyst to produce polymer gasoline therefrom, the method which comprises continuously passing the olefinic gas through a bed of the solid catalyst, maintaining the latter at optimum polymerizing temperature throughout the major portion of the time period during which the olefinic gas is passed therethrough, said optimum temperature being in excess of that at which there would be sufficient condensation of polymer gasoline to wash and clean the catalyst bed of heavier hydrocarbon material formed during the polymerization, and periodically during said time period lowering the temperature of the catalyst bed, for relatively short intervals, sufficiently to condense polymer gasoline on and wash heavier hydrocarbon material from the catalyst bed.

2. The method as defined in claim 1 further characterized in that said catalyst comprises a calcined mixture of a phosphoric acid and a siliceous material.

3. In the polymerization of normally gaseous olefins in the presence of solid phosphoric acid catalyst to produce polymer gasoline therefrom, the method which comprises continuously passing the olefinic gas through a bed of the phosphoric acid catalyst, maintaining the latter at a temperature of the order of 350–500° F. throughout the major portion of the time period during which the olefinic gas is passed therethrough, and periodically during said time period lowering the temperature of the catalyst bed, for relatively short intervals, to about 225° F. to condense polymer gasoline on and wash heavier hydrocarbon material from the catalyst bed.

4. A process for converting normally gaseous olefins into normally liquid hydrocarbons which comprises passing olefinic gas through a bed of solid polymerizing catalyst at an optimum vapor phase polymerizing temperature until substantial deposition of tarry substances on the catalyst has occurred, then reducing the temperature of the catalyst bed to a sufficiently lower temperature to condense on the catalyst bed a liquid solvent for said tarry substances, maintaining the catalyst at said lower temperature for a time period considerably shorter than that during which the catalyst is maintained at said optimum temperature but sufficient to effect substantial washing of tarry substances from the catalyst, thereafter restoring the catalyst bed to the optimum polymerizing temperature and continuing the passage of olefinic gas therethrough at the higher temperature for a longer time period than that of the reduced temperature treatment and until the catalyst bed has again been fouled with tarry depositions.

5. A process for converting normally gaseous olefins into normally liquid hydrocarbons which comprises passing olefinic gas through a bed of solid phosphoric acid catalyst at a temperature of the order of 350–500° F. until substantial deposition of tarry substances on the catalyst has occurred, then lowering the temperature of the catalyst bed to about 225° F. to condense on the catalyst bed a liquid solvent for said tarry substances, maintaining the catalyst at the lower temperature for a time period considerably shorter than that during which it is maintained at 350–500° F. but sufficient to effect substantial washing of tarry substances from the catalyst, thereafter restoring the temperature of the catalyst bed to the order of 350–500° F. and continuing the passage of olefinic gas therethrough at the higher temperature for a longer time period than that of the reduced temperature treatment and until the catalyst bed has again been fouled with tarry depositions.

ELMER R. KANHOFER.